United States Patent [19]

Griot

[11] 3,821,248

[45] June 28, 1974

[54] BIS-(P-CHLORPHENOXY) ACETIC ACID ESTERS

[75] Inventor: Rudolf G. Griot, Florham Park, N.J.

[73] Assignee: Sandoz-Wander, Inc., Hanover, N.J.

[22] Filed: May 27, 1970

[21] Appl. No.: 51,402

Related U.S. Application Data

[60] Division of Ser. No. 615,316, Feb. 13, 1967, Pat. No. 3,575,988, said Ser. No. 615,316, is a continuation-in-part of Ser. No. 598,970, Dec. 5, 1966, abandoned, which is a continuation-in-part of Ser. No. 568,759, July 29, 1966, abandoned, which is a continuation-in-part of Ser. No. 549,475, May 12, 1966, abandoned.

[52] U.S. Cl. 260/326.47, 260/247.2 B, 260/268 R, 260/268 PH, 260/293.53, 260/293.64, 260/293.81, 424/274

[51] Int. Cl. C07d 27/04
[58] Field of Search 260/326.3

[56] References Cited
OTHER PUBLICATIONS

Marie Agnes Brunet, Chemical Abstracts, Vol. 61 page 1793g, (1964).

*Primary Examiner*—Nicholas S. Rizzo
*Assistant Examiner*—Jose Tovar

[57] ABSTRACT

The compounds are of the class of basic esters of bis-(p-chlorophenoxy) acetic acid, e.g., bis-(p-chlorophenoxy)acetic acid B-(1-methyl-2-pyrrolidinyl)ethyl ester, which are useful as hypocholesteremic/hypolipemic agents.

3 Claims, No Drawings

BIS-(P-CHLORPHENOXY) ACETIC ACID ESTERS

This application is a division of Ser. No. 615,316, filed Feb. 13, 1967 now U.S. Pat. No. 3,575,988.

Said Ser. No. 615,316 in turn is a continuation-in-part of my copending application Ser. No. 598,970, filed Dec. 5, 1966, which in turn is a continuation-in-part of my copending application Ser. No. 568,759, filed July 29, 1966, which in turn is a continuation-in-part of my copending application Ser. No. 549,475, filed May 12, 1966, all three now abandoned.

This invention pertains to derivatives of acetic acid. In particular, the invention is directed to basic esters of bis(p-chlorophenoxy) acetic acid. The basic esters of the present invention may be represented structurally as follows:

[Structure I: bis(p-chlorophenoxy) acetic acid ester with CH—COOR]

wherein
R represents — $(CHR°)_n R^1$;

[Structure]

(the point of attachment being at either the 2- or 3-positions);

[Structure]

(the point of attachment being at either the 2—, 3— or 4—positions);

[Structure]

(the point of attachment being at either the 2— or 3—positions):

[Structure]

(the point of attachment being at either the 2— or 3—positions):

[Structure]

(the point of attachment being at either the 2— or 3—positions);

[Structure]

(the point of attachment being at either the 2—, 3— or 4—positions);

or 2—dimethylamino-2-methyl propyl;
$R^1$ represents

[Structures]

(the point of attachment being at either the 2— or 3-positions);

[Structure]

(the point of attachment being at either the 2—, 3— or 4—positions);

[Structure]

(the point of attachment being at either 2— or 3— positions);

[Structure]

(the point of attachment being at either the 2- or 3-positions);

[Structure]

(the point of attachment being at either the 2— or 3—positions);

[Structures]

or

[Structure with $R^4$, $R^5$]

n represents a whole number of from 1 to 4, inclusive;

each R°, independently, represents hydrogen or lower alkyl, preferably containing from 1 to 4 carbon atoms, e.g., methyl, ethyl, propyl and butyl;

n' represents 2, 3 or 4;

$R^2$ represents lower alkyl, preferably containing from 1 to 4 carbon atoms, e.g., methyl, ethyl, propyl and butyl; propargyl; phenyl; halophenyl, the halo substitutent preferably being bromo or chloro; or phenyl(lower)alkyl, the lower alkyl substituent preferably containing from 1 to 4 carbon atoms, e.g., benzyl phenethyl; phenthyl;

$R^3$ represents hydrogen; halo, preferably bromo or chloro; or lower alkyl, preferably containing from 1 to 4 carbon atoms, e.g., methyl, ethyl, propyl and butyl;

$R^4$ represents hydrogen; lower alkyl, preferably containing from 1 to 4 carbon atoms, e.g., methyl, ethyl, propyl and butyl; cycloalkyl containing from 5 to 7 ring carbon atoms, e.g. cyclopentyl, cyclohexyl and cycloheptyl; phenyl; phenyl)lower)alkyl, the lower alkyl substituent preferably containing from 1 to 4 carbon atoms, e.g., benzyl and phenethyl; 1-naphthyl; or 2-naphthyl; and $R^5$ represents lower, alkyl, preferably containing from 1 to 4 carbon atoms, e.g., methyl, ethyl, propyl and butyl; cycloalkyl containing from 5 to 7 ring carbon atoms, e.g., cyclopentyl, cyclohexyl and cycloheptyl; phenyl; or phenyl(lower)alkyl, the lower alkyl substituent preferably containing from 1 to 4 carbon atoms, e.g., benzyl and phenethyl; provided that when $R^4$ is hydrogen $R^5$ is phenyl.

As illustrative of the substituents represented by R there may be mentioned the following:

1-lower alkyl-4-piperidyl, e.g., 1-methyl-4-piperidyl and 1-ethyl-4-piperidyl; 1-lower alkyl-3-piperidyl, e.g., 1-methyl-3-piperidyl and 1-ethyl-3-piperidyl; 1-lower alkyl-2-piperidyl, e.g., 1-methyl-2-piperidyl and 1-ethyl-2-piperidyl; 1-phenyl-4-piperidyl; 1-phenyl-3-piperidyl; 1-phenyl-2-piperidyl; 1-benzyl-4-piperidyl; 1-benzyl-3-piperidyl; 1-phenethyl-4-piperidyl; 1-phenethyl-3-piperidyl; 1-propargyl-4-piperidyl; 1-propargyl-3-piperidyl; 1-[β-(p-chlorophenoxy)ethyl]-4-piperidyl; 3-quinuclidinyl; 2-quinuclidinyl; β-pyrrolidinoethyl; γ-pyrrolidinopropyl; β-piperidinoethyl; γ-piperidinopropyl; β-morpholinoethyl; γ-morpholinopropyl; β-dimethylaminoethyl; γ-diethylaminopropyl; β-anilinoethyl; γ-anilinopropyl; β-(N-methylanilino)ethyl; β(1-lower alkyl-2-pyrrolidinyl)ethyl, e.g., β-(1-methyl-2-pyrrolidinyl)ethyl; γ-(1-lower alkyl-2-pyrrolidinyl)propyl, e.g., γ-(1-methyl-2Pyrrolidinyl)propyl; β-(1-phenyl-3-pyrrolidinyl)ethyl; β-(1-phenyl-2-pyrrolidinyl)ethyl; β-(1-benzyl-3-pyrrolidinyl)ethyl; β-(1-benzyl-2-pyrrolidinyl)ethyl; β-(1-phenethyl-3-pyrrolidinyl)ethyl; β-(1-phenethyl-2-pyrrolidinyl)ethyl; β-(1-propargyl-3-pyrrolidinyl)ethyl; β-(1-phenethyl-2-pyrrolidinyl)ethyl; β-(1-propargyl-3-pyrrolidinyl)ethyl; β-(1-propargyl-2-pyrrolidinyl)ethyl; and β-[1-[β-(p-chlorophenoxy)ethyl]-3-pyrrolidinyl]ethyl.

The above-noted compounds can be prepared by a one-step process which involves the reaction of either an alkyl ester of bis-(p-chlorophenoxy) acetic acid or a dialkyl ester of bis-(p-chlorophenoxy)malonic acid with an appropriate alcohol. Alternatively, the compounds may be prepared by converting bis-(p-chlorophenoxy)acetic acid to its corresponding acid halide and reacting the latter with an appropriate alcohol or alcoholate. These processes are illustrated by the following reaction scheme:

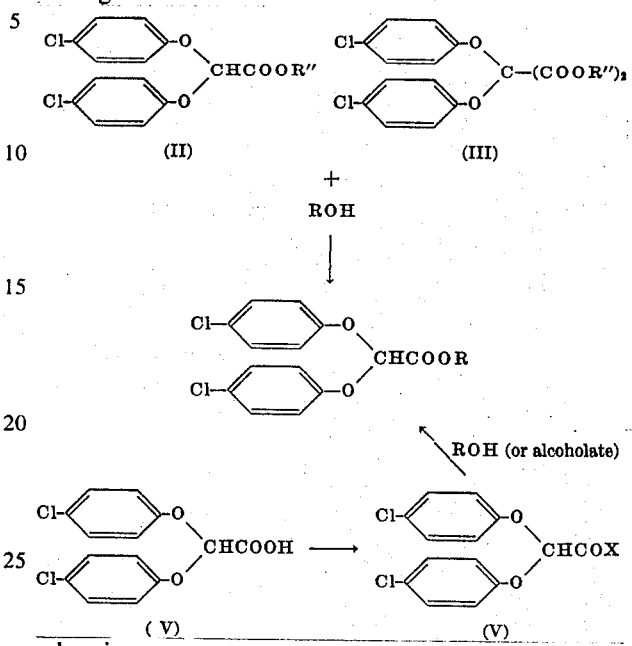

wherein

R is as previously defined;

R'' represents lower alkyl, preferably containing from 1 to 4 carbon atoms, e.g., methyl), ethyl, propyl and butyl; and X represents chlorine or bromine.

The reaction of the mono- or di-alkyl ester (II or III) with the appropriate alcohol is carried out in a suitable inert organic solvent, e.g. benzene, toluene and xylene, and in the presence of an alkali metal alkoxide, such as sodium methoxide or sodium ethoxide. The reaction is conveniently effected at an elevated temperature, preferably the reflux temperature of the system. The desired product is readily recovered in conventional manner.

In the alternative process, bis-(p-chlorophenoxy)acetic acid (IV) is converted to the corresponding acid halide (V) by reaction with thionyl chloride or other suitable reagent commonly used for this purpose, e.g., thionyl bromide, phosphorus pentachloride and phosphorus pentabromide. The reaction is conveniently carried out in a suitable inert organic solvent and at room temperature (20°C) or elevated temperatures up to reflux temperature of the system. However, the use of a solvent is not necessary since an excess of the halide reagent can be employed for this purpose. It is generally preferred to carry out the reaction in the presence of a catalytic amount of dimethylformamide. The reaction of the thus-obtained acid halide with the appropraite alcohol or alcoholate is conveniently effected in a suitable inert organic solvent, e.g., benzene, toluene, chloroform and diethyl ether, and at room temperature (20°C) or below. The reaction, if desired, can be carried out at elevated temperatures; however, in such instances, external cooling should be provided since the reaction is highly exothermic. Preferably the reaction is carried out at a temperature of from about −10° to about 5°C. Where the free alcohol is employed it is desirable to provide a means for taking up the liberated hydrogen halide. This can be accomplished by employing an excess of the alcohol or by carrying out the reaction in the presence of an alkali metal carbonate, e.g., potassium carbonate, or suitable inert base, e.g., pyridine. Where an alcoholate is used, the alkali metal salts, particularly the sodium and potassium salts, are preferred. The desired product thus obtained is readily recovered in conventional manner.

The mono- and di-alkyl esters (II and III) employed as starting materials are readily prepared by reacting p-chloro-sodium phenolate (prepared from p-chlorophenol and sodium hydride) with a lower alkyl dichloroacetate or di-(lower) or dibromomalonate, respectively. The reaction is readily carried out in a suitable inert organic solvent, e.g., dimethylacetamide, diethylacetamide and dimethylformamide, and at room temperature or elevated temperature (which should not exceed about 80°C. when it is desired to prepare the esters of formula III).

The bis-(P-chlorophenoxy) acetic acid (IV), employed as the starting material for the alternative process described above, can be readily prepared in conventional manner from either the mono- or di-alkyl ester (II or III) by reacting the same in an aqueous, inert organic solvent, with a strong base, at room temperatures. The base is preferably one which will yield a water-soluble salt of the desired acid, e.g., sodium hydroxide and potassium hydroxide. The acid then is obtained by simply treating the thus-obtained salt with a mineral acid, such as hydrochloric acid, in conventional manner. The acid (IV) can also be prepared by decarboxylating the free malonic acid (III, R''=H) in conventional manner.

Many of the alcohols employed as starting materials are known and can be prepared as described in the literature. Such others which may not be specifically known can be prepared from available materials in analogous manner. The alcoholates can be prepared from the corresponding alcohols in conventional manner.

Certain of the compounds of formula I have asymmetric centers and therefore exist as optical isomers. The respective isomers can be readily separated by conventional techniques or they can be selectively prepared employing the desired isomeric form of the alcohol reactant and accordingly are included within the scope of this invention.

Representative compounds which can be made in the manner set forth above and are included within the scope of this invention are set forth in tabular form below. For convenience only, the compounds are identified by setting forth the significance of the ester moiety represented by R in structural formula I. However, it is to be understood that the designation of the compounds in this manner is merely in lieu of setting forth the chemical name thereof.

| Compound | R |
|---|---|
| 1 | pyrrolidinyl-N-CH₃ |
| 2 | pyrrolidinyl-N-phenyl |
| 3 | pyrrolidinyl-N-C₂H₅ |
| 4 | pyrrolidinyl-N-(p-chlorophenyl) |
| 5 | pyrrolidinyl-N-CH₂-phenyl |
| 6 | pyrrolidinyl-N-CH₂CH₂-phenyl |
| 7 | -CH₂CH₂-N(pyrrolidinyl) |
| 8 | -CH₂CH₂CH₂-N(CH₃)(pyrrolidinyl) |
| 9 | -CH₂CH₂-N(pyrrolidinyl)-phenyl |
| 10 | -CH₂CH₂-N(pyrrolidinyl)-CH₂-phenyl |
| 11 | -CH₂CH₂-N(pyrrolidinyl)-CH₂CH₂-phenyl |

The compounds of the present invention (formula I) are useful because they possess pharmacological activity in animals. In particular, the compounds possess marked hypocholesteremic activity and can be used as hypocholesteremic/hypolipemic agents.

For such usage, the compounds may be admixed with conventional pharmaceutical carriers, and other adjuvants, if necessary, and administered orally in such forms as tablets, elixirs, suspensions or solutions. Furthermore the compounds may be similarly administered in the form of their non-toxic pharmaceutically acceptable acid addition or quaternary salts. Such salts do not materially differ from the free base in their pharmacological effects and are included within the scope of the invention. The acid addition salts are readily prepared by reacting the base with pharmacologically acceptable acids in conventional manner. Representative of such salts are the mineral acid salts such as the hydrochloride, hydrobromide, sulfate, phosphate and the like and the organic acid salts such as the benzoate, acetate, maleate, p-toluenesulfonate, benzene-sulfonate and the like. Similarly, the quaternary salts are prepared by reacting the base with pharmacologically acceptable quaternizing agents in conventional manner. Exemplary of the quaternary salts are those derived from common quaternizing agents such as straight-chain lower alkyl halides wherein the lower alkyl group preferably contains from 1 to 4 carbon atoms and the halide substitutent is either chloride, bromide or iodide, e.g., methyl bromide, methyl chloride, ethyl bromide, methyl iodide and ethyl iodide, and straight-chain di-(lower) alkyl sulfates, e.g., dimethyl sulfate.

For the above-mentioned use, the dosage administered will, of course, vary depending on the compound employed. However, in general, satisfactory results are obtained when administered at a daily dosage of from about 4 milligrams to about 30 milligrams per kilogram of animal body weight, preferably given in divided doses, 2 to 4 times a day, or in sustained release form. For most mammals the administration of from about 0.25 grams to about 2 grams of the compound in divided doses of from about 62.5 milligrams to about 1,000 milligrams 2 to 4 times a day, is adequate for the treatment of hypercholesteremia/hyperlipemia. A representative formulation suitable for oral administration is a tablet (prepared by standard tabletting techniques) and containing, by weight, 50 parts of bis-(p-chlorophenoxy)acetic acid 1-methyl-4-piperidyl ester (as the free base), 2 parts of tragacanth, 39.5 parts of lactose, 5 parts of corn starch, 3 parts of talcum and 0.5 parts of magnesium stearate.

As noted hereinabove certain of the compounds of formula I exist as optical isomers. In some instances, enhanced activity or other beneficial attribute may be found with respect to a particular isomer and in such instances administration of such isomer may be preferred.

The following examples show representative compounds contemplated by the present invention and the manner in which said compounds are made. However, it is to be understood that the examples are intended for the purpose of illustration only and are not intended as in any way limiting the scope of the invention which is defined in the appended claims.

EXAMPLE 1

Bis-(p-chlorophenoxy)acetic acid β-pyrrolidinoethyl ester.

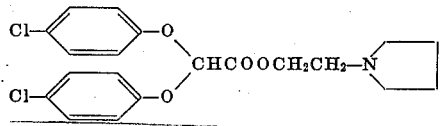

To a mixture of 122 g. (0.373 mole) of bis-(p-chlorophenoxy) acetic acid methyl ester, 50 g. (0.435 mole) of 1-(β-hydroxyethyl) pyrrolidine and 200 ml. of benzene is added with stirring 1 g. of sodium methoxide. The resulting mixture is heated at 100°C. for 1 hour and then cooled to about 15°–20°C. To the cooled mixture is added 500 ml. of benzene and 500 ml. of water. The aqueous phase is then extracted with 500 ml. of benzene and the combined organic layers washed twice with 500 ml. (each) of water and then evaporated on a rotary evaporator. The residue is dissolved in 200 ml. of isopropanol. To the cooled alcohol solution (5°C.) is added, with stirring, a solution of 11 percent hydrochloric acid in isopropanol until the pH thereof is 1. The resulting mixture is filtered, the filtrate cooled overnight at −5°C. The resulting solid material is filtered off and then slurried at reflux with 50 ml. Ligroin. The solids are recovered by filtration, then slurried at 20°C. with 100 g. of carbon tetrachloride and filtered off to obtain bis-(p-chlorophenoxy) acetic acid β-pyrrolidinoethyl ester hydrochloride, m.p. 115–130°C.

EXAMPLE 2

Bis-(p-chlorophenoxy)acetic acid β-(1-methyl-2-pyrrolidinyl)ethyl ester

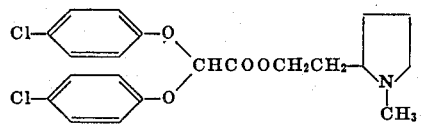

To a mixture of 2.50 g. (0.022 mole) of 1-1-methyl-2-(β-hydroxyethyl) pyrrolidine, 2.50 g. (0.025 mole) of triethylamine and 10 ml. of toluene, cooled to 0°C., is added dropwise 55 ml. of a toluene solution containing 0.03 mole of bis-(p-chlorophenoxy)acetyl chloride at a rate such that the reaction temperature does not exceed about 5°C. After the addition is completed, the mixture is stirred overnight at 20°C., then 50 ml. of chloroform is added and the resulting mixture extracted with 50 ml. of 10 percent aqueous sodium carbonate solution. The organic phase is dried over potassium carbonate and evaporated to obtain 1-bis-(p-chlorophenoxy)acetic acid β-(1-methyl-2-pyrrolidinyl)ethyl ester as a viscous oil.

The fumarate salt thereof, m.p. 149°–150.5°C., is obtained by treating the oily base with a methanolic solution of fumaric acid, precipitating the salt by the addition of diethyl ether and recrystallizing the thus obtained salt from methanol-diethyl ether (1:1).

What is claimed is:

1. A compound selected from the group consisting of compounds of the formula:

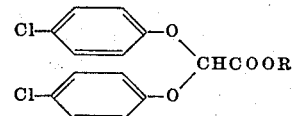

and the non-toxic acid addition and quaternary salts thereof, wherein R represents $-(CHR^\circ)_nR^1$, or $R^1$ represents

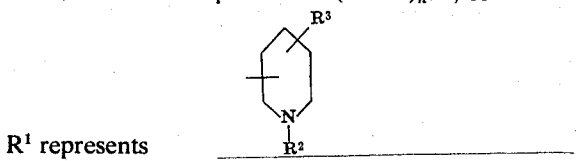

n represents a whole number of from 1 to 4, inclusive;

each $R^\circ$, represents hydrogen;

$R^2$ represents alkyl having from 1 to 4 carbon atoms, propargyl, phenyl, halophenyl, or phenyl(lower)alkyl, the (lower) alkyl substituent having from 1 to 4 carbon atoms; and $R^3$ represents hydrogen.

2. The compound of claim 1 which is bis-(p-chlorophenoxy)acetic acid β-pyrrolidinoethyl ester.

3. The compound of claim 1 which is bis-(p-chlorophenoxy)acetic acid β-(1-methyl-2-pyrrolidinyl)ethyl ester.

* * * * *

UNITED STATES PATENT OFFICE
CERTIFICATE OF CORRECTION

Patent No. 3,821,248　　　　　　　Dated June 28, 1974

Inventor(s) Rudolf G. Griot

It is certified that error appears in the above-identified patent and that said Letters Patent are hereby corrected as shown below:

On the cover sheet after item "[22]" insert -- The portion of the term of the patent subsequent to Dec. 8, 1987, has been disclaimed.

Signed and sealed this 10th day of December 1974.

(SEAL)
Attest:

McCOY M. GIBSON JR.　　　　　　C. MARSHALL DANN
Attesting Officer　　　　　　　Commissioner of Patents

UNITED STATES PATENT AND TRADEMARK OFFICE
CERTIFICATE OF CORRECTION

PATENT NO. : 3,821,248
DATED : June 28, 1974
INVENTOR(S) : Rudolf G. Griot

It is certified that error appears in the above—identified patent and that said Letters Patent is hereby corrected as shown below:

In the title, delete the word "CHLORPHENOXY" and insert in its place the word "CHLOROPHENOXY".

After the word "ABSTRACT" add -- OF THE DISCLOSURE --.

In the Abstract of the Disclosure, at the 3rd line before "-(1-methyl", change "B" to -- β --.

Column 2, lines 1 - 6, delete the structure:

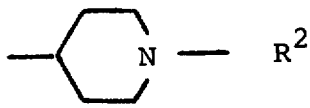

and insert in its place the structure:

-- 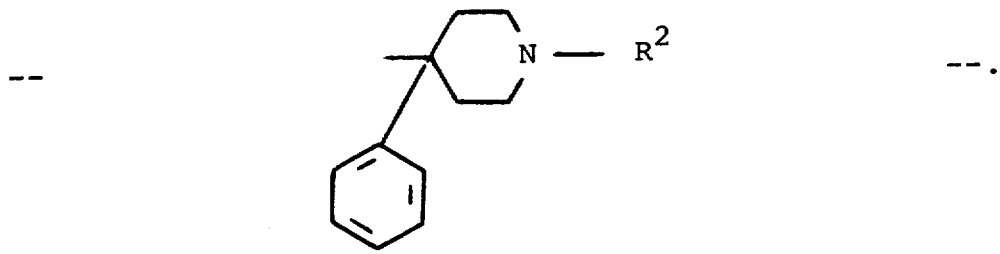 --.

UNITED STATES PATENT AND TRADEMARK OFFICE
CERTIFICATE OF CORRECTION

PATENT NO. : 3,821,248
DATED : June 28, 1974
INVENTOR(S) : Rudolf G. Griot

It is certified that error appears in the above—identified patent and that said Letters Patent is hereby corrected as shown below:

Column 2, lines 27 to 36, delete the structure:

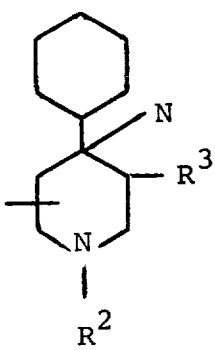

and insert in its place the structure:

-- 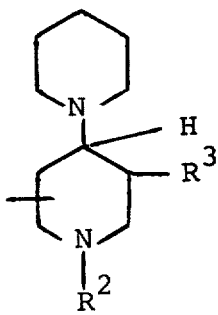 --.

UNITED STATES PATENT AND TRADEMARK OFFICE
CERTIFICATE OF CORRECTION

PATENT NO. : 3,821,248
DATED : June 28, 1974
INVENTOR(S) : Rudolf G. Griot

It is certified that error appears in the above—identified patent and that said Letters Patent is hereby corrected as shown below:

Column 3, line 13, after the word "benzyl", add the word -- and --.

Column 3, line 13, after the word "phenethyl", delete the word "phenthyl;".

Column 3, lines 61 -62, delete "β-(1-phenethyl-2-pyrrolidinyl)ethyl; β-(1-propargyl-3-pyrrolidinyl)ethyl;"

Column 4, line 27 under the structure on the left, delete "(V)" and insert in its place -- (IV) --.

Column 5, line 10, delete the word "or" in its second occurrence and insert the word -- alkyl --.

Column 8, line 20, after the word "1-", delete "1-".

Column 8, line 31, before the word "bis", delete "1-".

UNITED STATES PATENT AND TRADEMARK OFFICE
CERTIFICATE OF CORRECTION

PATENT NO. : 3,821,248
DATED : June 28, 1974　　　　　　　　　　Page 4 of 4
INVENTOR(S) : Rudolf G. Griot It is certified that error appears in the above—identified patent and that said Letters Patent is hereby corrected as shown below:

Column 8, lines 47 - 52 delete the structure:

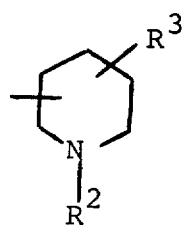

and insert in its place the structure:

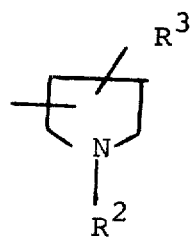

Signed and Sealed this

*Twenty-eighth* Day of *October 1980*

[SEAL]

*Attest:*

SIDNEY A. DIAMOND

*Attesting Officer*　　　*Commissioner of Patents and Trademarks*